United States Patent [19]

Chiodo et al.

[11] Patent Number: 5,696,636
[45] Date of Patent: Dec. 9, 1997

[54] PRISM TO PROVIDE VISIBILITY OF A SIGNAL LIGHT IN TWO DIRECTIONS

[75] Inventors: Christopher E. Chiodo, Brookline; Mathew J. Palazola, Gloucester, both of Mass.

[73] Assignee: Sun Microsystems, Inc., Mountain View, Calif.

[21] Appl. No.: 468,246

[22] Filed: Jun. 6, 1995

[51] Int. Cl.$^6$ .................................................. G02B 5/04
[52] U.S. Cl. ............................................. 359/837; 359/833
[58] Field of Search ................................. 359/737, 738, 359/808, 811, 819, 639, 640, 831, 837, 833, 834

[56] References Cited

U.S. PATENT DOCUMENTS

| | | | |
|---|---|---|---|
| 4,469,407 | 9/1984 | Cowan et al. | 359/738 |
| 4,577,941 | 3/1986 | Kubota | 359/640 |
| 4,704,000 | 11/1987 | Pekar et al. | 359/402 |
| 4,724,533 | 2/1988 | Ohara et al. | 369/112 |
| 5,251,117 | 10/1993 | Nagai | 362/311 |

*Primary Examiner*—David C. Nelms
*Assistant Examiner*—Jordan M. Schwartz
*Attorney, Agent, or Firm*—Julian Caplan; Flehr Hohbach Test Albritton & Herbert

[57] ABSTRACT

An insert is installed at a corner and two adjacent edges of an enclosure for electronic equipment so that a signal light, such as an LED, may be observed from two sides of the enclosure. The insert has a prism to refract light in both directions from an LED or similar signal light supported on the insert in a fixed position relative to the prism. The corner of the prism is rounded to function as a lens. The corner of the enclosure is cut away at the upper edges of the converging sides and the cut-away area filled with the lens. An apron depending from the insert may be welded or otherwise adhered to the interior of the enclosure.

18 Claims, 2 Drawing Sheets

PRISM TO PROVIDE VISIBILITY OF A SIGNAL LIGHT IN TWO DIRECTIONS

BACKGROUND OF THE INVENTION

1. Field of the Invention

This invention relates to a new and improved light emitting diode prism indicating a power-on state located at the corner of a piece of electrical equipment so configured that the light is equally visible from the front and right side of the object.

2. Prior Art

LED have been installed in electrical equipment to indicate power-on state, but these have been visible only from one direction. The present invention employs a prism so constructed that the LED is visible from two directions, providing approximately 180° field of view.

SUMMARY OF THE INVENTION

The present invention is installed preferably in the corner of the enclosure for electronic equipment. A prism is visible from two sides of the enclosure. Light emitted from the LED is directed through the prism to refract light in both directions.

A principal object of the present invention is to create a prism for a highly directional LED to allow light to be seen from two directions. Preferably the lens is located on the front-right corner of a CPU housing where it is desirable to determine whether the equipment is energized from the front or from the right side.

The LED provides light along a highly directional path which, in the past, has been one direction only, resulting in poor visibility from the front and poor visibility from the side. The present invention incorporates a prism in the light path to refract the light.

Additionally the prism has a curved surface at the front-right corner to further diffuse the light. In addition, highly polished and matte surfaces are combined to further enhance the light transmission properties of the invention.

The prism is preferably formed integral with a support for the LED which accurately locates relative to the prism and also provides clips to secure the cord for the LED in place.

As a means for attaching the prism to the CPU enclosure, an apron is formed integral with the prism and extending downward to contact the inside wall of the enclosure so that it may be welded to the enclosure thereby locating the prism in position.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figures 1, 2:
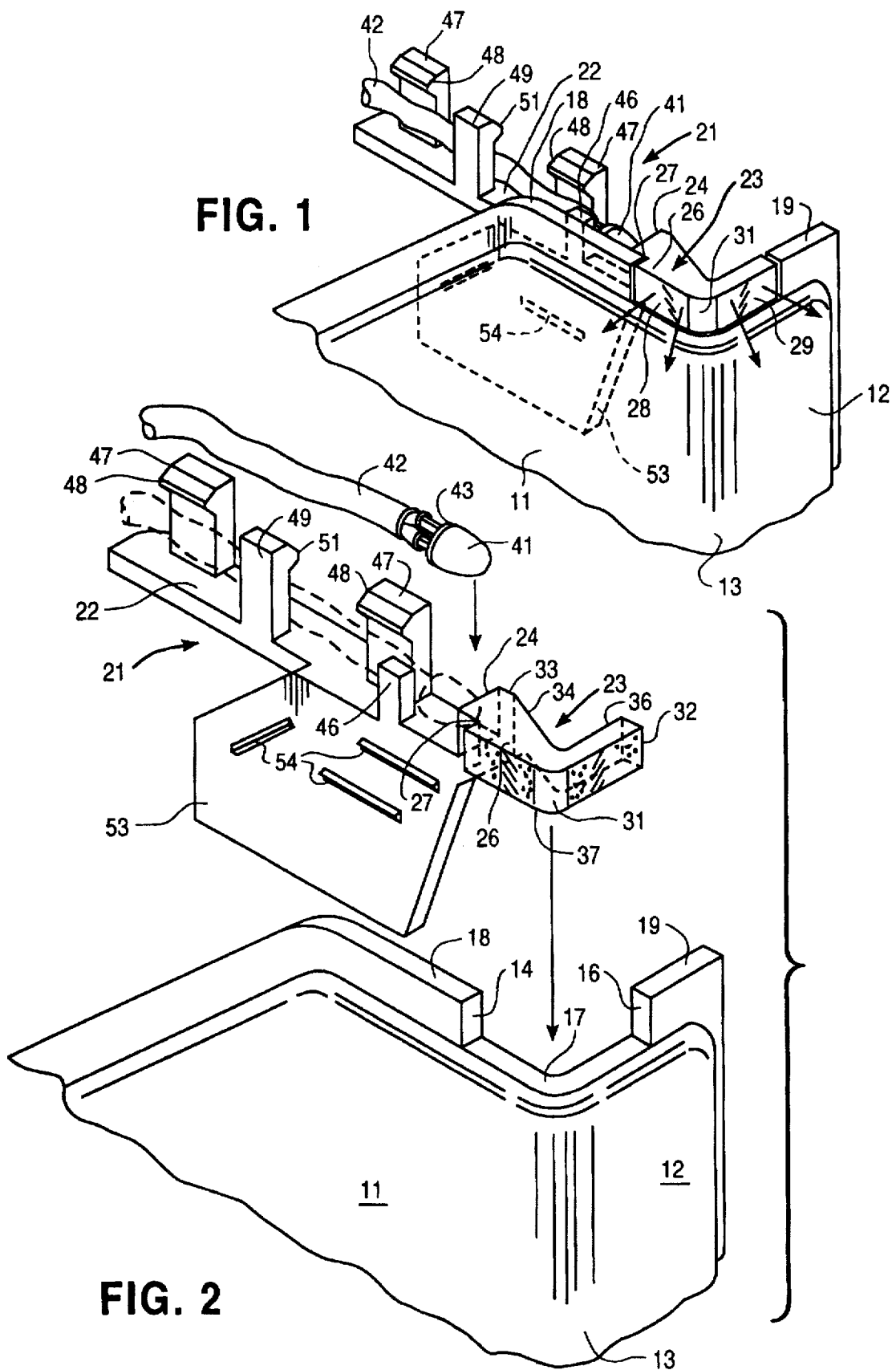
FIG. 1 is a perspective view showing the device installed in a corner of an enclosure.
FIG. 2 is an enlarged, exploded perspective view of the structure of FIG. 1.

A portion of an enclosure for a central processing unit or other electrical device is illustrated in FIGS. 1 and 2 wherein it will be seen that the enclosure has a front 11 and a side 12 which are joined by a rounded corner 13. An approximately vertical transverse edge 14 is formed extending down from the top edge 18 of front 11 and a similar transverse vertical edge 16 is formed extending down from the top edge 19 of the side 11. A horizontal ledge 17 joins the lower ends of edges 14 and 16, extending around the corner 13.

Insert 21 comprises a horizontal port 22 having at its right end prism 23. Entrance edge 24 of prism 23 is designed to fit behind and perpendicular to front 11. The prism 23 has an outward extension 26 having horizontal top and bottom surfaces and a vertical outer edge. The extension 26 is formed with a cutout corner 27 dimensioned to engage tightly against vertical edge 14. Front face 28 thus, as best seen in FIG. 1, constitutes a continuation of front 11. Side face 29 constitutes an extension of side 12 and the distal end 32 thereof abuts vertical edge 16.

Figure 3:
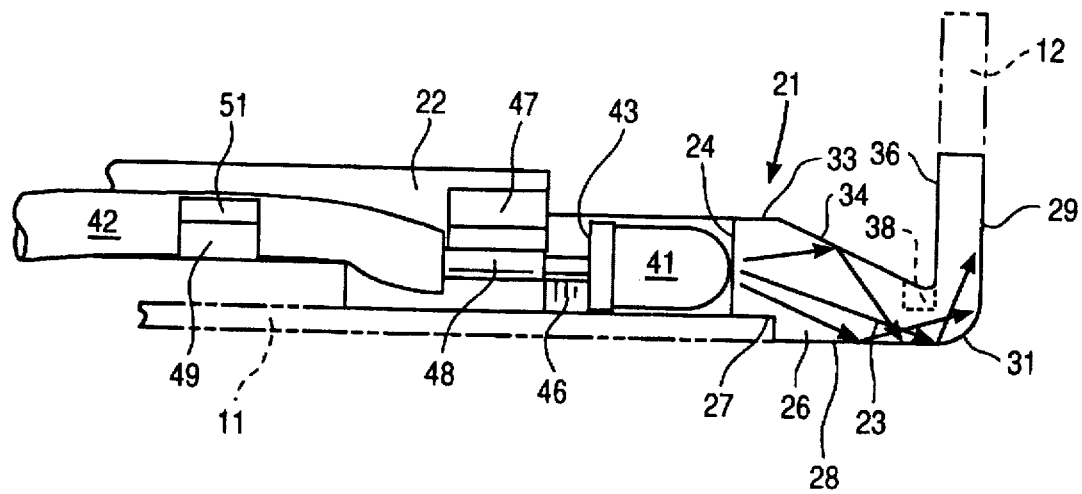
FIG. 3 is a top plan view of a portion of the structure of FIG. 1.
Figure 4:
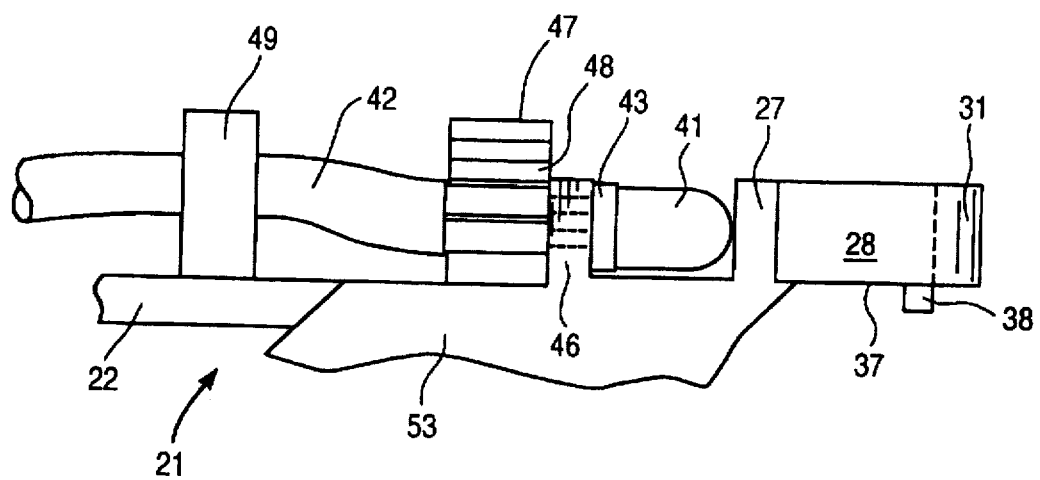
FIG. 4 is a side elevational view of the structure of FIG. 3 with the enclosure removed.

Inside entrance face 33 of prism 23 is approximately vertical, parallel to and spaced inward of face 11 and terminates in vertical slanted face 34 which, in effect, forms a prism. The angle between surface 34 and an extension of surface 33 is preferrably 22.15°. Inside vertical side face 36 is generally parallel to the vertical inside face of side 12. Bottom face 37 is horizontal and rests on ledge 17. Locating pin 38 (see FIGS. 3 and 4) depends from extension 26 and fits into the inside of corner 13.

LED 41 has cords enclosed in a wire sheath 42 extending up to the rear edge 43 of the LED. Extending upward from horizontal support 22 is a locator post 46. The rear edge 43 of LED 41 is positioned engaging post 46. This locates the LED 41 in exact position relative to prism 23. Clips 47 extend up from the back edge of horizontals support 22, having outward projections 48. Intermediate clip 49 about half way between clips 47 is located on the outer edge of horizontal support 22 and clip 49 has an inward projection 51. As best seen in FIG. 1, the sheath 42 and wires there within are held in place by clips 47, 47 and 49.

Depending from support 22 is a vertical apron 53 having energy concentration ribs 54 formed therein. The apron 53 is positioned immediately behind from 11 and welded thereto.

Prism 23 is so located that the cutout corner 27 engages the vertical edge 14 cut down from top edge 18 and the distal end 32 engages the vertical edge 16 cut down from top edge 19. Front face 28 is substantially co-planar with face 11 and side face 29 is substantially co-planar with face 12 whereas rounded corner 31 is located immediately above corner 13.

Light emitted from diode 41 enters prism 23 through entrance edge 24. Slanted surface 34 refracts the light partially outwardly through front face 28 in one direction and partially outwardly through side face 29 in a direction at right angles to face 28. Surfaces 24, 33, 34, 36 and 32 as well as the two vertical surfaces forming angle 27 are highly polished. Surfaces 28, 29 and 31 as well as the top and bottom surfaces are matte.

It will thus be seen that the diode light is equally visible from the front and right side. It will be understood that prism 23 may be located in other areas of the housing to make the emitted light visible from various directions, as required.

As used in the accompanying claims, the terms "horizontal" and "vertical" are used as the device is viewed in the accompanying drawings. It will be understood that the device, in use, may be positioned in other directions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A prism-like device of light transmitting material having a first surface, a second surface approximately at a right-angle to said first surface, a corner at an intersection of said first and second surfaces, a first end approximately perpendicular to said first surface located spaced from said corner and having a first edge adjacent said first surface and a second edge spaced from said first surface, a slanted surface extending from adjacent said second edge and slanting toward said corner and having a terminal edge spaced inward from said corner, a narrow, approximately rectangular member extending horizontally away from said corner and approximately perpendicular to said first surface, said second surface being located on said rectangular member, said rectangular member terminating in a second end spaced from said corner, said device being wider at said first end than at said corner, said first and second surfaces, said slanted surface, said first and second ends, and said first, second and terminal edges being vertical, said device having a horizontal top and a bottom, whereby light passing through said first end is emitted outwardly from both said first and second surfaces.

2. A device according to claim 1 in which said corner is formed with a radius about a vertical centerline.

3. A device according to claim 2 in which said light emitting from said first and second surfaces is substantially horizontal.

4. A device according to claim 1 in which said first end is behind the plane of said first surface and spaced laterally thereof.

5. A device according to claim 4 in which said device has a support surface extending outward of said first end, and locating means on said support surface to locate a light emitting means on said support surface so that light from said light emitting means is directed into said first end.

6. A device according to claim 5 in which said support surface further comprises clips extending from said support surface to engage an electric cord for said light emitting means.

7. A device according to claim 5 which further comprises an apron extending at right angles to said support surface for connection to a casing for electrical equipment on which said device is installed.

8. In combination, a device according to claim 1 and a casing for equipment, said casing having a first casing side parallel to said first surface, a second casing side parallel to said second surface, and a casing corner comprising approximately an extension of said first-mentioned corner, said bottom engaging and being supported by said casing.

9. The combination of claim 8 in which an upper edge of said casing is cut away in a ledge, said bottom resting on said ledge.

10. The combination of claim 9 in which said top is substantially coplanar with said upper edge.

11. The combination of claim 9 in which said device further comprises a depending locating pin engaging behind said casing corner.

12. The combination of claim 9 in which said device is cut out with a right-angle corner said first casing side and said second casing side; having first and second vertical transverse edges respectively, one surface of said cutout corner engaging said first vertical transverse edge and another surface of said cutout corner engaging behind said first side, said second end of said device engaging said second vertical transverse edge.

13. The combination of claim 8 in which said first-mentioned corner is formed with a radius about a vertical centerline.

14. The combination of claim 8 in which said first and second surfaces and said first and second ends are parallel to a first axis and said top and bottom are parallel to a second axis perpendicular to said first axis and in which said first and second sides of said casing are parallel to said first axis.

15. The combination of claim 8 which said first end is behind the plane of said first side and spaced rearwardly of said first surface of said casing.

16. The combination of claim 15 in which said device has a support surface extending outward of said first end, and locating means on said support surface to locate a light emitting means on said support surface so that light from said light emitting means is directed into said first end.

17. The combination of claim 16 in which said support surface further comprises clips extending from said support surface to engage an electric cord for said light emitting means.

18. The combination of claim 16 which further comprises an apron extending at right angles to said support surface, said apron lying behind said first casing side and means securing said apron to said first casing side.

* * * * *